(12) United States Patent
Norberg et al.

(10) Patent No.: US 10,227,065 B2
(45) Date of Patent: Mar. 12, 2019

(54) DAMPING DEVICE

(71) Applicant: Robert Bosch GmbH, Stuttgart (DE)

(72) Inventors: Jens Norberg, Stuttgart (DE); Patrick Schellnegger, Ludwigsburg (DE); Andreas Lechler, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 182 days.

(21) Appl. No.: 15/312,574

(22) PCT Filed: Mar. 23, 2015

(86) PCT No.: PCT/EP2015/056087
§ 371 (c)(1),
(2) Date: Nov. 18, 2016

(87) PCT Pub. No.: WO2015/176849
PCT Pub. Date: Nov. 26, 2015

(65) Prior Publication Data
US 2017/0088109 A1    Mar. 30, 2017

(30) Foreign Application Priority Data

May 21, 2014    (DE) .......................... 10 2014 209 682

(51) Int. Cl.
*F16L 55/04* (2006.01)
*B60T 15/36* (2006.01)
(Continued)

(52) U.S. Cl.
CPC ............ *B60T 15/36* (2013.01); *B60T 8/4068* (2013.01); *F16L 55/053* (2013.01);
(Continued)

(58) Field of Classification Search
CPC ...... F15B 2201/3158; F15B 2201/3153; F15B 2201/21
(Continued)

(56) References Cited

U.S. PATENT DOCUMENTS 4,136,714 A  *  1/1979  Jones ........................ F15B 1/18
                                                          138/30
5,735,314 A  *  4/1998  Alaze .................... B60T 8/4068
                                                          138/31
(Continued)

FOREIGN PATENT DOCUMENTS

DE    10 2011 089 183 A1    6/2013
DE    10 2012 207 334 A1    11/2013
(Continued)

OTHER PUBLICATIONS

International Search Report corresponding to PCT Application No. PCT/EP2015/056087, dated Jul. 8, 2015 (German and English language document) (5 pages).

*Primary Examiner* — Patrick F Brinson
(74) *Attorney, Agent, or Firm* — Maginot, Moore & Beck LLP

(57) ABSTRACT

A damping device, for example for damping pressure pulses in a brake circuit of a slip-controllable hydraulic vehicle brake system, includes a damper chamber with a pressure medium volumetric capacity, which can be varied in a pressure-dependent manner, and a flow resistor connected downstream thereof. Disadvantageously, the pressure medium volumetric capacity of the damping device is not available for the brake pressure build-up when the brake pressure is generated by the driver, and the pedal travel on a brake master cylinder of a vehicle brake system is therefore lengthened. A mechanism limits the pressure medium volumetric capacity of the damping device in the case of a passive braking operation. In the case of partially active or fully active braking operations, in contrast, the mechanism has no effect and the full scope of the pressure medium volumetric capacity of the damping device is available for damping pressure pulses.

11 Claims, 3 Drawing Sheets

(51) Int. Cl.
  *B60T 8/40* (2006.01)
  *F16L 55/055* (2006.01)
  *F16L 55/053* (2006.01)
  *B60T 8/48* (2006.01)

(52) U.S. Cl.
  CPC ........... *F16L 55/055* (2013.01); *B60T 8/4872* (2013.01); *B60T 2270/306* (2013.01)

(58) Field of Classification Search
  USPC ..................................................... 138/31, 30
  See application file for complete search history.

(56) References Cited

U.S. PATENT DOCUMENTS

| | | | |
|---|---|---|---|
| 6,478,051 B1 * | 11/2002 | Drumm ................... | F15B 1/033 |
| | | | 138/30 |
| 6,988,514 B2 * | 1/2006 | Weber .................... | F15B 1/165 |
| | | | 137/504 |
| 8,656,960 B2 * | 2/2014 | Haecker ................... | F15B 1/04 |
| | | | 138/30 |

FOREIGN PATENT DOCUMENTS

| | | |
|---|---|---|
| EP | 0 362 378 A1 | 3/1990 |
| JP | 2011-5887 A | 1/2011 |
| JP | 2011-51469 A | 3/2011 |
| JP | 2013-147176 A | 8/2013 |
| JP | 2014-40215 A | 3/2014 |
| WO | 99/38740 A1 | 8/1999 |

* cited by examiner

DAMPING DEVICE

This application is a 35 U.S.C. § 371 National Stage Application of PCT/EP2015/056087, filed on Mar. 23, 2015, which claims the benefit of priority to Serial No. DE 10 2014 209 682.0, filed on May 21, 2014 in Germany, the disclosures of which are incorporated herein by reference in their entireties.

BACKGROUND

The disclosure concerns a damping device, in particular for damping pressure pulses in a brake circuit of a slip-controllable hydraulic vehicle brake system. Such damping devices are disclosed for example in DE 10 2011 089 183 A1.

Slip-controllable brake systems, also known as ESP brake systems, support the driver in critical driving situations. The trade distinguishes various operating modes of these brake systems, namely a passive, a partly active or a fully active brake mode.

In passive brake mode, the wheel brake pressure is generated by the driver, e.g. by actuation of a brake pedal.

In partly active mode, the pressure in the brake system is higher than established by the driver, which means that the brake pressure generated by the driver is amplified by the brake system.

In fully active mode however, the driver does not actuate the brake pedal at all and the brake pressure is provided solely by a pressure generator provided in the brake system.

Mostly, reciprocating piston pumps are used as pressure generators. One or more piston pumps may be assigned to each brake circuit of the vehicle brake system. In principle, reciprocating piston pumps work cyclically, whereby the pressure is built up not evenly and linearly, but in stages depending on the delivery behavior of the pump element. The pressure pulses of reciprocating piston pumps are audible in the vehicle interior and/or perceptible as vibrations at the brake pedal. Both are undesirable from a comfort aspect.

In order to smooth out pressure pulses, therefore, damping devices are provided downstream of the pressure generator. As disclosed in DE 102011089183 A1, these damping devices provide a combination of a pressure-medium capacity with a pressure-medium receiving volume which varies depending on brake pressure, and a downstream flow resistance. The latter may be configured as a constant choke with a fixed flow cross-section, or as a dynamic choke with a flow cross-section which varies pressure-dependently.

One undesirable side effect of these damping measures is that the pressure-medium volume taken up by the pressure-medium capacity is not available for building up brake pressure, and therefore in passive operating mode of the vehicle brake system, i.e. when the brake pressure is generated by the driver, the pedal travel required to build up a specific brake pressure at the brake master cylinder is extended.

It would be possible to limit the pedal travel extension by limiting the receiving volume of the damping device, but this would result in less effective damping properties in the partly active or fully active brake mode.

In this context, the object of the refinement of damping devices is to maintain or improve their damping properties without extending the pedal travel required for generating the brake pressure in passive operating mode of the vehicle brake system.

SUMMARY

To achieve this object, the disclosure proposes means which limit the pressure-medium receiving volume of the damping device in the passive operating mode of the vehicle brake system, and hence counter an extension of the pedal travel. In the partly active or fully active operating mode of the vehicle brake system, the proposed means are however inactive, so that the pressure-medium receiving volume is available to its full scope for damping any pressure pulses occurring. The disclosure thus allows the use of damping devices with a pressure-medium receiving volume larger than in known embodiments, and correspondingly optimized damping properties.

Further advantages or advantageous embodiments of the disclosure arise from the description below.

BRIEF DESCRIPTION OF THE DRAWINGS

Exemplary embodiments of the disclosure are shown in the drawing and explained in detail in the description which follows.

FIGS. 1 and 2 show a first and a second exemplary embodiment of the disclosure in longitudinal sections through damping devices which are equipped with choke bodies in the form of pistons configured with stepped outer diameters, known as stepped pistons, while

DETAILED DESCRIPTION

Figure 1:
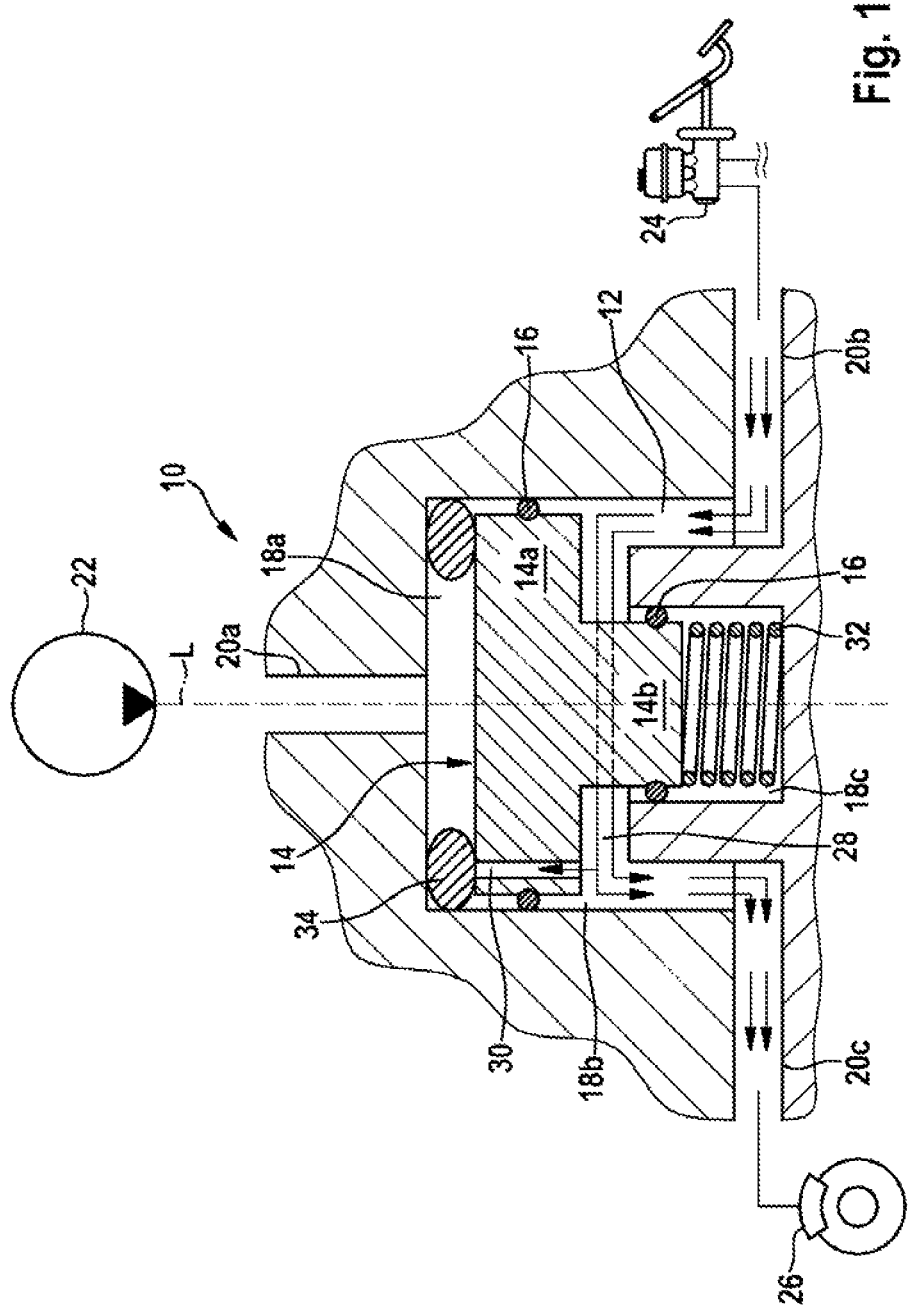

The damping device 10 shown in FIG. 1 comprises a cylindrical cavity 12 with a single right-angled step in its inner diameter. A choke body in the form of a correspondingly stepped piston 14 is guided movably in this cavity 12. This stepped piston 14 is divided into two piston portions 14a, 14b which have differently sized outer diameters and are coaxially adjacent to each other in the direction of the longitudinal axis L of the stepped piston 14. Both piston portions 14a, 14b are provided with seals 16 on the periphery. As a whole, the damping device 10 is therefore divided into three damper chambers 18a, 18b, 18c which are delimited by the stepped piston 14 and the wall surrounding the cavity 12, and are sealed from each other.

A first damper chamber 18a at the top in FIG. 1 is delimited by the end face of the piston portion 14a with the larger piston diameter. It is connected to a high-pressure side of a pressure generator 22 via a first pressure-medium port 20a.

A second damper chamber 18b formed between the two seals 16 is configured annular and extends along the periphery of the second piston portion 14b with the smaller diameter. This second damper chamber 18b is connected to the brake master cylinder 24 of a vehicle brake system via a second pressure-medium port 20b, and in contact with a wheel brake 26 via a third pressure-medium port 20c. The second pressure-medium port 20b lies diametrically opposite the third pressure-medium port 20c, wherein a pressure-medium connection 28 exists between the pressure-medium ports 20b, 20c which runs along the periphery of the piston portion 14b with the smaller diameter and has a flow cross-section which is variable in the direction of the longitudinal axis L of the stepped piston 14. The flow cross-section depends on the momentary position of the stepped piston 14 inside the cavity 12. In this way, the effect of a flow resistance is generated which chokes the flow of pressure medium to the wheel brake 26.

Because of the seals 16 on the two piston portions of the stepped piston 14, the damper chambers 18a and 18b are sealed from each other. However, the stepped piston 14 has a choke channel 30 which creates a pressure-medium connection between the two damper chambers 18a and 18b. This choke channel 30 is arranged on the first piston portion 14a of the stepped piston 14 with the larger diameter, runs axially parallel to its longitudinal axis L and lies radially outside the diameter of the adjacent second piston portion 14b with the smaller diameter. The choke channel 30 opens into the second damper chamber 18b.

The third damper chamber 18c of the damping device 10 is delimited by the end face of the piston portion 14b with the smaller outer diameter, and by the assigned portion of the wall of the cavity 12. This third damper chamber 18c receives a spring element 32 which rests at one end on the base of the cavity 12 and at the other end on the smaller of the two end faces of the stepped piston 14. The force of the spring element 32 forces the stepped piston 14 into its base position. In this base position, the first damper chamber 18a assumes its minimum volume, and the second and third damper chambers 18b, 18c each assume their maximum volume. The flow cross-section of the pressure-medium connection 28 between the pressure-medium port 20b on the brake master cylinder side and the pressure-medium port 20c on the wheel brake side of the second damper chamber 18b is also at its maximum, and correspondingly its choke effect is minimal.

The damping device 10 described functions as follows: In partly active or fully active operating mode of the vehicle brake system, brake pressure is generated by the externally driven pressure generator 22. This delivers brake fluid into the damper chamber 18a of the damping device 10, from which the pressure medium flows via the choke channel 30 of the stepped piston 14 into the damper chamber 18b, and from there finally to the connected wheel brake 26. Pressure pulses generated by the pressure generator 22 cause the stepped piston 14 to move to and fro inside the cavity 12 of the damping device 10, changing the flow cross-section of the pressure-medium connection 28 between the pressure-medium port 20b on the brake master cylinder side and the pressure-medium port 20c of the wheel brake 26, and at the same time changing the volume ratio between the damper chambers 18a and 18b, with the result that pressure pulses are compensated or smoothed by the damping device 10.

However in passive operating mode of the vehicle brake system, i.e. with the pressure generator 22 not actuated, when the driver builds up brake pressure, pressure medium is moved into the damper chamber 18b. Part of the inflowing pressure medium passes via the choke channel 30 in the stepped piston 14 under reduced pressure into the damper chamber 18a, while a second part of the pressure medium flows out from the damping device 10 to the wheel brake 26.

The rising pressure in the damper chamber 18a acts on the larger of the two end faces of the stepped piston 14 and presses the stepped piston 14 against the return force of the spring element 32 and against the pressure force on the ring face of smaller surface area delimiting the damper chamber 18b, downward according to FIG. 1, until a force equilibrium is reached between the forces acting on the stepped piston 14. The damper chamber 18a of the damping device 10 then takes up pressure-medium volume which is no longer available to build up brake pressure in the wheel brake 26 and hence, at the brake master cylinder 24, the pedal travel required to build up a specific brake pressure at the wheel brake 26 is extended.

To avoid this extension in pedal travel, according to the disclosure means 34 are provided which delimit the pressure-medium receiving volume of the damping device 10 when the stepped piston 14 is in the base position.

According to FIG. 1, these means 34 comprise a sealing ring arranged in the damping chamber 18a, the mean radius of which corresponds to the distance of the choke channel 30 from the longitudinal axis L of the damping device in the radial direction. When the stepped piston 14 is pressed into its base position by the spring element 32, the sealing ring covers the cross-section of the choke channel 30 opening into the damper chamber 18a, and thus interrupts the pressure-medium connection between the damper chambers 18a and 18b. When brake pressure is built up by the driver, no pressure medium can flow out of the damper chamber 18b into the damper chamber 18a, and the stepped piston 14 is fixed in its base position. Thus in this operating mode of the vehicle brake system, the damping device 10 is ineffective; however, this has no functional disadvantages because in this operating mode, the pressure generator 22 is not actuated and hence no pressure pulses occur.

In contrast, on partly or fully active brake pressure build-up, i.e. when the pressure generator 22 is actuated, the pressure medium delivered causes pressure to build up in the damper chamber 18a and consequently causes the stepped piston 14 to move against the force of the spring element 32 of the damper chamber 18c. The stepped piston 14 moves away from the proposed means 34 and opens the pressure-medium connection between the damper chambers 18a, 18b. The damping device 10 can then act as described above and damp the pressure pulses triggered by the pressure generator 22.

Figure 2:
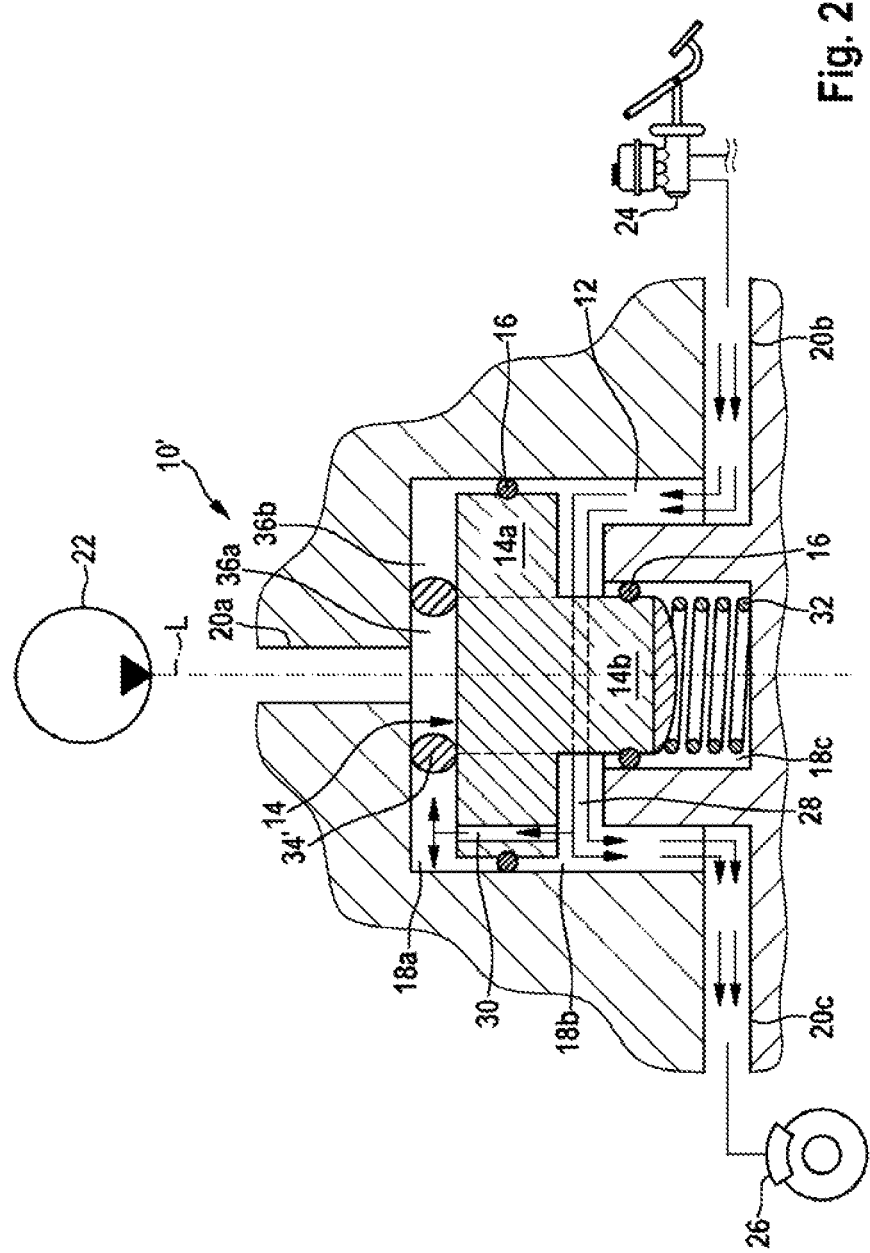

In the second exemplary embodiment of a damping device 10' according to the disclosure as shown in FIG. 2, the means 34' according to the disclosure have different outer dimensions from those in FIG. 1. The other components correspond to each other and therefore carry the reference numerals used in FIG. 1. According to FIG. 2, the sealing ring forming the means 34' for limiting the pressure-medium receiving volume of the damping device 10' has a mean radius which corresponds at least approximately to the radius of the smaller piston portion 14b of the stepped piston 14.

In the base position of the damping device 10', the damper chamber 18a is thus divided into a part chamber 36a surrounded by the sealing ring and a part chamber 36b lying outside the sealing ring. The choke channel 30 of the stepped piston 14 opens into the outer part chamber 36b, so that when brake pressure is built up by the driver, pressure medium flows from the damper chamber 18b into the part chamber 36b. The piston end face in the region of the part chamber 36b is smaller than or at most as large as the opposing piston ring face of the stepped piston 14 assigned to the damper chamber 18b, so that no resulting force is formed to lift the stepped piston 14 against the force of the spring element 32 away from the ring or from the means 34' for limiting the pressure-medium receiving volume of the damping device 10'.

The use of the sealing ring as a means 34 or 34' is evidently not compulsory. In particular in the exemplary embodiment according to FIG. 1, stud-like, peg-like or conical means could also be used which are arranged at a point on the wall of the damper chamber 18a lying opposite the choke channel 30 of the stepped piston 14.

The damping devices 10 and 10' shown in FIGS. 1 and 2 and explained in this context are, as shown, fitted with a rigid choke body in the form of a spring-actuated stepped piston 14. Instead of the stepped piston, alternatively elastically deformable choke bodies configured for example as a membrane or spring bellows could be used. A solution with a choke body in the form of an elastically deformable membrane 60 is shown in FIG. 3.

Figure 3:
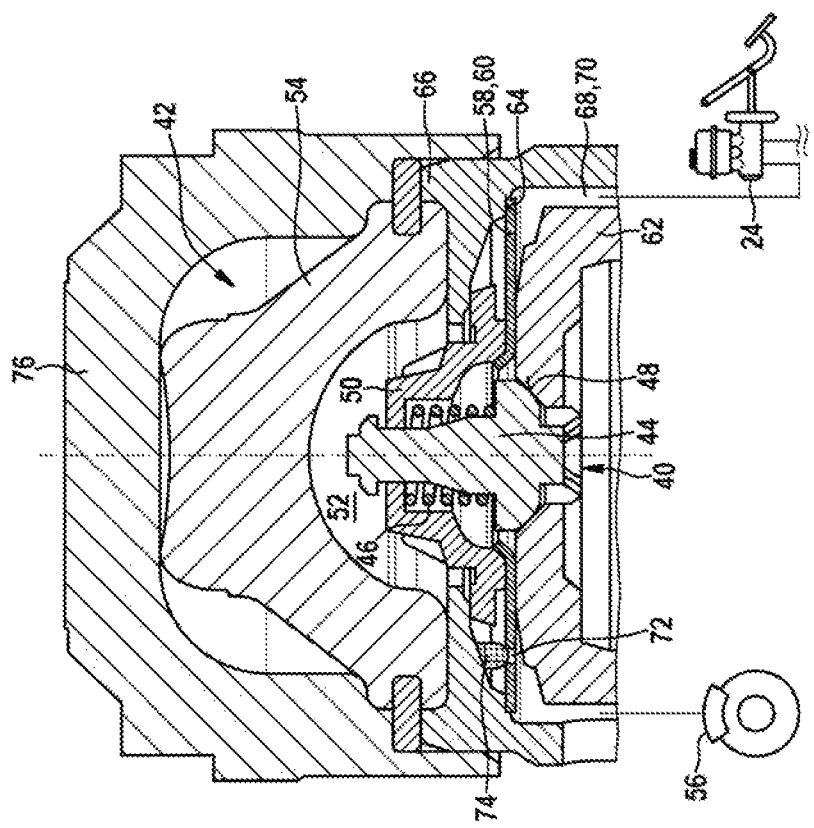
FIG. 3 shows a third exemplary embodiment of the disclosure in a longitudinal section through a damping device which is fitted with an elastically deformable choke body.

FIG. 3 shows the pump outlet valve 40 of a pressure generator and a damping device 42 arranged downstream thereof. The pump outlet valve 40 has a mushroom-shaped closing body 44 which is pressed against an outlet valve seat 48 by an outlet valve spring 46. For this, the outlet valve spring 46 is supported on a spring holder 50 and on the back of a dome-shaped head of the closing body 44. When the outlet valve seat 48 is opened, pressure medium flows under high pressure into a first damper chamber 52 of the damping device 42. Its wall is formed by a cup-shaped limiting element 54 made of elastomer material. The limiting element 54 is received in the interior of a pot-like plug 76, but only partially fills the space available. The damper chamber 52 enclosed by the limiting element 54 can therefore change its pressure-medium receiving volume depending on the pressure of the in-flowing pressure medium.

In addition to the existing connection of the damper chamber 52 to the pump outlet valve 40 or the high-pressure side of the pressure generator, the damper chamber 52 is in contact with a wheel brake 56. This flow connection contains a dynamic choke which changes its flow cross-section as a function of the pressure difference on its two sides. The dynamic choke comprises a membrane 60 which is made of elastically deformable material, preferably spring steel. This is clamped fixedly in the region of its inner diameter between the spring holder 50 and the face end of a bearing bush 62 of the pressure generator, and lies with its outer diameter under mechanical pretension on a shoulder 64 which is formed on a valve carrier 66 receiving the pump outlet valve 40. The valve carrier 66 is a hollow cylindrical body which surrounds the bearing bush 62 in portions on its periphery, forming a gap 68 for conducting pressure medium. As the pressure in the damper chamber 52 rises, the pressure forces acting on the membrane 60 cause it to deform, whereby on the periphery it lifts away from the shoulder 64 at least in portions and opens a flow-choking cross-section, through which the pressure medium flows into the gap 68 between the bearing bush 62 and the valve carrier 66, and from there to the wheel brake 56. The gap 68 forms a second damper chamber 70 of the damping device 42. The damper chamber 70 is connected firstly to the brake master cylinder of the vehicle brake system and secondly to the wheel brake 56, so that brake pressure generated by the muscular force of the driver passes directly from the brake master cylinder 24 to the wheel brake 56. The second damper chamber 70 or the gap 68 is connected to the first damper chamber 52 via a choke channel 72 in the membrane 60. The choke channel 72 thus creates another choked pressure-medium connection between the two damper chambers 52 and 70.

In order now to prevent brake fluid from flowing out of the second damper chamber 70 via the choke channel 72 into the first damper chamber 52—and hence no longer being available for building up brake pressure in the wheel brake 26—when the vehicle brake system is in passive operating mode, i.e. when the brake pressure is generated solely by the driver and not by the pressure generator, in this exemplary embodiment again means 74 are provided which limit the pressure-medium receiving volume of the damping device 42 when the choke body, formed in the exemplary embodiment in FIG. 3 by the membrane 60, is in the base position. These means 74 are for example a protruding peg which is placed on the valve carrier 66 such that it closes a cross-section of the choke channel 72 of the membrane 60 opening into the damper chamber 52 when the membrane 60 lies on the assigned shoulder 64 of the valve carrier 66, i.e. assumes the base position.

In partly or fully active operating mode of the vehicle brake system, i.e. when the brake pressure is provided by the pressure generator, the pressure in the first damper chamber 52 of this damping device 42 is so high that the choke body or membrane 60 is lifted away from the shoulder 64 and the peg of the cross-section of the choke channel 72 opening into the damper chamber 52, and hence a choked pressure-medium connection exists between the damper chambers 52 and 70. The delivery flow of the pressure generator reaches the first damper chamber 52, can flow onward from there (choked) into the gap 62 and finally to the wheel brake 56. Pressure pulses of this delivery flow are damped by the first damper chamber 52 of variable volume and actively connected to the flow resistance 58 formed downstream thereof. This flow resistance 58 results from the pressure-dependently variable flow cross-section between the shoulder 64 and the periphery of the membrane 60, and the cross-section of the choke channel 72 of the membrane 60.

Evidently, changes or additions to the exemplary embodiments described are conceivable without leaving the basic concept of the disclosure.

The invention claimed is:

1. A damping device for damping pressure pulses, comprising:
    a choke body configured to be moved or deformed against a resistance force and configured to separate a first damper chamber, which has a variable volume, from a second damper chamber;
    a choke channel formed on the choke body and arranged between the first damper chamber and the second damper chamber; and
    a mechanism configured to limit a pressure-medium receiving volume of the first damper chamber when the choke body is in a base position and to close the choke channel when the choke body is in the base position such that the first damper chamber is sealed off from the second damper chamber.

2. The damping device as claimed in claim 1, wherein the mechanism is configured to close a cross-section of the choke channel that opens into the first damper chamber.

3. The damping device as claimed in claim 1, wherein the mechanism includes a sealing ring, which is arranged in the first damper chamber.

4. The damping device as claimed in claim 1, wherein the mechanism includes one of a peg, a cone, and a pin, which is arranged in the first damper chamber.

5. The damping device as claimed in claim 1, wherein:
    the choke body includes a stepped piston with a stepped outer diameter, the stepped piston configured to be actuated against a force of a return spring, and the stepped piston configured to be received reciprocatingly movably in a cavity of the damping device, which has a correspondingly stepped inner diameter.

6. The damping device as claimed in claim 1, wherein the choke body has an elastically deformable membrane, which lies on its periphery against a shoulder of the damping device.

7. The damping device as claimed in claim 1, wherein:
- the first damper chamber is connected to a pressure side of a pressure generator via a first pressure-medium port;
- the second damper chamber is connected to a brake master cylinder of the vehicle brake system via a second pressure-medium port; and
- the second damper chamber is connected to a wheel brake of the vehicle brake system via a third pressure-medium port.

8. The damping device as claimed in claim 7, wherein the second pressure-medium port is arranged diametrically opposite of the third pressure-medium port with respect to the stepped piston.

9. The damping device as claimed in claim 7, wherein the second pressure-medium port and the third pressure-medium port are connected via a pressure-medium connection that runs along an outer periphery of the stepped piston.

10. The damping device as claimed in claim 9, wherein the pressure-medium connection includes a flow cross-section that varies based on a movement of the choke body in an axial direction.

11. A damping device for damping pressure pulses, comprising:
- a choke body configured to be moved or deformed against a resistance force and configured to separate a first damper chamber, which has a variable volume, from a second damper chamber;
- a choke channel arranged between the first damper chamber and the second damper chamber; and
- a mechanism configured to limit a pressure-medium receiving volume of the first damper chamber when the choke body is in a base position,
- wherein the choke channel is the only passage connecting the first damper chamber and the second damper chamber.

* * * * *